United States Patent [19]

Stalcup et al.

[11] 4,221,469

[45] Sep. 9, 1980

[54] THERMALLY STABILIZED MIRROR

[75] Inventors: Robert K. Stalcup, Lake Park; Russell L. Carlson, North Palm Beach, both of Fla.

[73] Assignee: United Technologies Corporation, Hartford, Conn.

[21] Appl. No.: 51,657

[22] Filed: Jun. 25, 1979

[51] Int. Cl.³ ............................................. G02B 5/08
[52] U.S. Cl. .................................................... 350/310
[58] Field of Search ................................. 350/288, 310

[56] References Cited

U.S. PATENT DOCUMENTS

| | | | |
|---|---|---|---|
| 3,708,223 | 1/1973 | Sorensen et al. | 350/310 |
| 3,781,094 | 12/1973 | Guest | 350/310 |
| 3,817,800 | 6/1974 | Dunn et al. | 350/288 X |
| 3,884,558 | 5/1975 | Dunn et al. | 350/310 X |
| 3,909,118 | 9/1975 | Schmidt | 350/288 X |
| 4,110,013 | 8/1978 | Eitel | 350/310 |

*Primary Examiner*—F. L. Evans
*Attorney, Agent, or Firm*—Lawrence A. Cavanaugh

[57] ABSTRACT

An optical mirror having coolant means for compensating thermal tilt of the reflective surface is disclosed. The optical mirror has a laminated structure formed of a plurality of plates including a faceplate, a second plate, a third plate, a substrate plate and a back plate each having coolant means therein for passing a coolant therethrough. The plurality of plates are bonded together to form the laminated structure. Each of a plurality of first coolant channels disposed within the faceplate have a substantially parallel relationship with one another and a substantially vertical, parallel relationship with each of a plurality of second coolant channels disposed within the second plate. Counterflowing coolant within adjacent coolant channels in the faceplate and in the second plate and between vertically adjacent first and second coolant channels essentially eliminates tilt of the reflective surface resulting from the absorbed heat load and the frictional heating of the coolant flowing through the coolant channels. Heating channels disposed within the back plate are adapted for passing heated coolant therethrough for inducing a thermal stress within the back plate in a direction and magnitude to balance bending stress produced within the faceplate by the thermal growth of the faceplate in the radial direction resulting from heat generated by radiation incident thereon.

5 Claims, 4 Drawing Figures

THERMALLY STABILIZED MIRROR

BACKGROUND OF THE INVENTION

This invention relates to optical mirrors and more particularly to a thermally compensated mirror having means for compensating tilt of the reflective surface.

Mirrors when subjected to intense beam of radiation are subject to extreme thermal loads resulting in thermal deformation of the mirror substrate with a corresponding distortion of the reflective surface. Many applications utilizing optical mirrors require that the optically reflective surface of the mirror maintain its desired configuration to within one-twentieth to one-one hundredth of the wavelength of the radiation incident thereon. Accordingly, the mirrors typically require cooling to maintain the stringent requirements on the reflective surface. Unfortunately, passing a coolant through the mirror results in stresses being generated within the mirror from the uneven pressure distribution of the coolant flowing therethrough and from the frictional heating of the coolant flowing through the coolant passages within the mirror.

Eitel in U.S. Pat. No. 4,110,013, filed Apr. 13, 1977 and held with the present application by a common assignee, discloses a metal cooled mirror having a faceplate assembly with a laminated structure comprising five plates with coolant channels disposed therein for passing coolant in heat exchanger relationship thereto. The laminated structure has means for passing a coolant therethrough in heat exchanger relationship therewith for minimizing the temperature increase of the mirror and the resulting thermal deformation thereto. Dunn et al. in U.S. Pat. No. 3,884,558, filed July 3, 1972 discloses a laminated mirror structure having a faceplate with grooves disposed therein adapted for providing a counterflow of coolant through alternate grooves therein. A second plate disposed adjacent the faceplate includes grooves disposed therein in a perpendicular relationship to the grooves disposed within the faceplate and adapted for passing coolant therethrough with counterflow of the coolant between adjacent coolant channels. Additionally, Sorenson et al. in U.S. Pat. No. 3,708,223 discloses an optical mirror having a faceplate with an optically reflective surface in heat exchanger relationship with coolant passages in which the flow of coolant in adjacent coolant passages is preferably countercurrent in order to cool the optically reflective surface in a thermally balanced manner. See also Griest in U.S. Pat. No. 3,781,094 and Dunn et al. in U.S. Pat. No. 3,817,800.

The prior art devices all suffer from the disadvantage that flowing coolant therethrough yields a temperature difference produced by absorbed and frictional heating across the width of the mirror resulting in a tilt distortion of the reflective surface of the mirror.

SUMMARY OF THE INVENTION

The primary object of the present invention is to minimize tilt of a reflective surface of a mirror resulting from thermal distortion of the mirror.

In accordance with the present invention a mirror having a laminated structure adapted for compensating thermal tilt distortion comprises a faceplate having a first side with a reflective surface and a second side having a plurality of first coolant channels formed therein adapted for passing coolant in heat exchanger relationship therewith, a second plate having a first side disposed against the second side of the faceplate and a second side having a plurality of second coolant channels disposed therein adapted for passing coolant therethrough in heat exchanger relationship therewith wherein the plurality of second coolant channels within the second plate are in vertical alignment with the plurality of first coolant channels within the faceplate, means disposed within the second plate for passing coolant into and out of the first coolant channels, a third plate having a first side disposed against the second side of the second plate and a second side having a plurality of third coolant channels disposed therein adapted for passing coolant therethrough wherein each of the plurality of third coolant channels is in vertical alignment with alternate coolant channels of the second coolant channels, means disposed within the third plate for passing coolant to and from the second plate, a back plate having a first side with a plurality of fourth channels disposed therein adapted for passing fluid in heat exchanger relationship thereto, and a substrate disposed between the back plate and the third plate wherein the substrate includes a coolant distribution channel adapted for passing coolant from a source to the third plate, a coolant return manifold adapted for passing fluid to the back plate, and a coolant exit manifold adapted for collecting coolant flowing from the third plate and the faceplate and directing said coolant from the mirror.

A primary feature of the present invention is the vertical alignment of the second coolant channels within the second plate with the first coolant channels within the faceplate. Additionally, alternate first coolant channels within the faceplate are adapted for passing fluid therethrough in counterflow directions. Also alternate second coolant channels within the second plate are adapted for passing coolant therethrough in counterflow directions and vertically aligned first coolant channels and second coolant channels are adapted for passing coolant therethrough in counterflow directions. Additionally, fourth channels within the back plate are adapted for passing coolant therethrough in heat exchanger relationship therewith to heat the back plate and the substrate plate to induce thermal distortions therein, said induced thermal distortions having a direction and magnitude to counter distortions in the faceplate resulting from the absorption of radiant energy at the reflective surface of the mirror.

A primary advantage of the present invention is the high degree of resistance of the reflective surface to thermal tilt. Substantially uniform cooling of the faceplate results from the counterflow of coolant through alternate first coolant channels therein. Counterflow of coolant between adjacent coolant channels within the faceplate and the second plates and between vertically aligned coolant channels in the faceplate and the second plates results in the tilt generated by coolant passing within the faceplate being substantially counterbalanced by tilt generated by coolant passing within the second plate such that essentially no tilt occurs in the reflective surface.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

Figure 1:
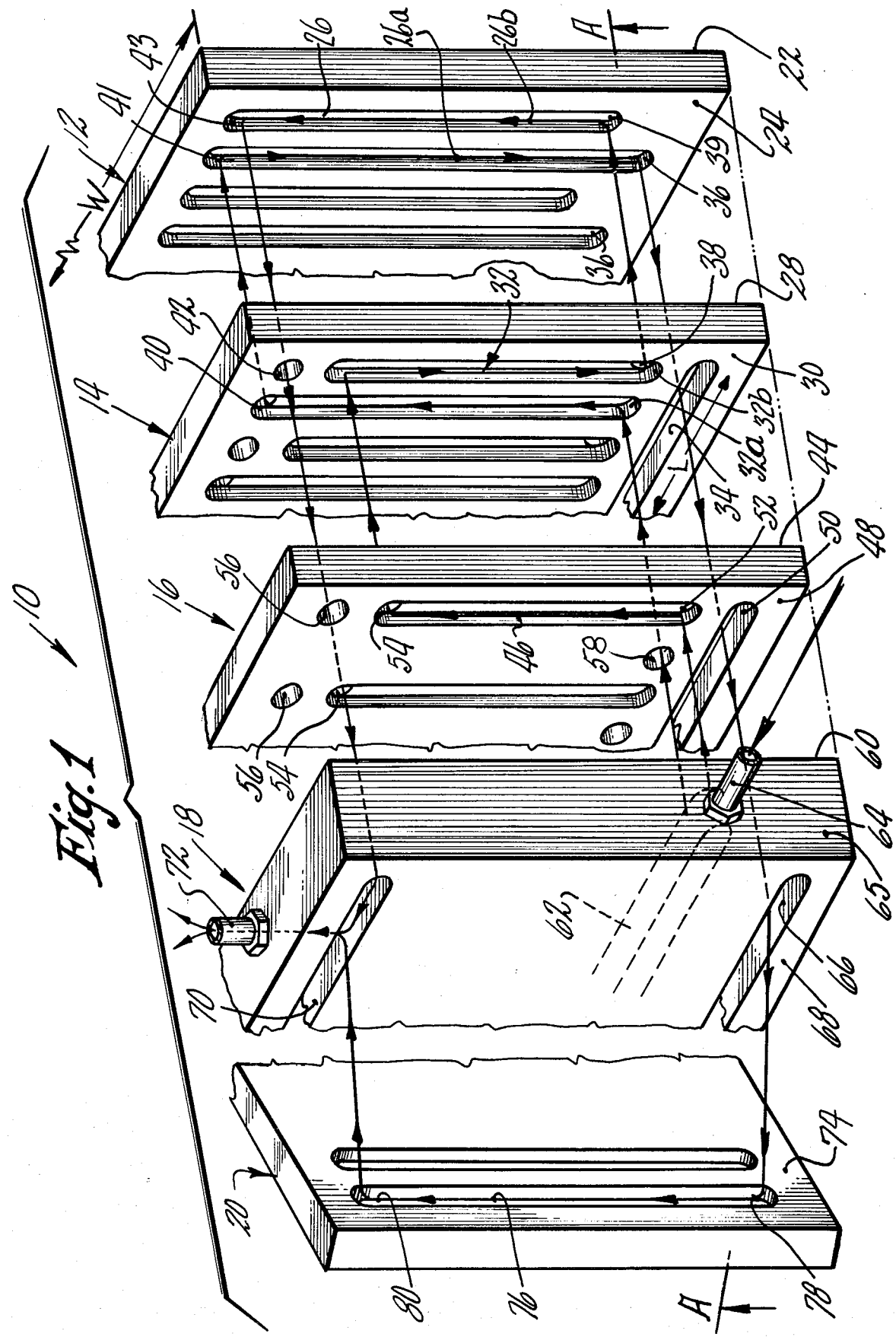
FIG. 1 is a simplified exploded perspective view of a laminated mirror in accordance with the present invention.

In the embodiment of the present invention shown in FIG. 1 there is illustrated a mirror 10 adapted for having coolant passing therethrough. The mirror is fabricated with a plurality of plates, including a faceplate 12, a second plate 14, a third plate 16, a substrate plate 18 and a back plate 20 which are bonded together by means well known in the art to form a laminated unitary structure having means for circulating a coolant therethrough as described hereinafter.

The faceplate 12 has a first surface 22 adapted for providing a reflective surface of the mirror by optical polishing or other means well known in the art and a second surface 24 having a plurality of first coolant channels 26 disposed therein in a substantially parallel relationship to one another. The plurality of first coolant channels include channels having a first length 26a and a second length 26b disposed adjacent one another in a sequentially repetitive manner across a substantial portion of the width of the second surface.

The second plate 14 has a first surface 28 adapted for cooperating with the adjacent second surface 24 of the faceplate to enclose the first coolant channels therebetween forming conduits for conducting a coolant fluid within the faceplate in heat exchanger relationship with the faceplate and the second plate and a second surface 30 having a plurality of second coolant channels 32 disposed therein in a substantially parallel relationship to one another. The plurality of second coolant channels include second coolant channels having a first length 32a and a second length 32b alternately positioned adjacent one another in a repetitive manner across a substantial portion of the width of the second plate. The second cooling channels 32a and 32b are also disposed within the second surface 30 in a substantially vertical horizontal relationship with the first coolant channels 26a and 26b respectively. A return channel 34 having an elongated elliptical shape and extending between the first surface and the second surface of the second plate is disposed within the second plate proximate a first end of the plurality of second coolant channels 32 in a substantially perpendicular relationship thereto, and in alignment with and in flow communication with the ends 36 of the first coolant channels having the first length 26a. The return channel 34 has a length L substantially equal to the width W of the plurality of first coolant channels 26. The second coolant channels having the second length 32b each have a first-through hole 38 disposed within the first end proximate the return channel 34 in substantial alignment with the first ends 39 of the first coolant channels having the second length 26b within the faceplate. The first-through holes are adapted for cooperating with second coolant channels having a second length 32b and first coolant channels having a second length 26b to provide a flow path therebetween. Second-through holes 40 are disposed within the ends of the second coolant channels having the first length 32a which are remote from the return channel 34 and extend through the second plate and are in flow alignment with the second ends 41 of the first coolant channels having a first length 26a. Third-through holes 42 are disposed within the second plate proximate the ends of the second coolant channels having a second length 32b remote from the return channel 34 in flow alignment with the second ends 43 of the first coolant channels within the faceplate having a second length 26b.

The third plate 16 has a first surface 44 adapted for cooperating with the second surface 30 of the second plate to enclose the plurality of second coolant channels therebetween to form conduits for passing a coolant fluid in heat exchanger relationship with the second and third plate. A plurality of third coolant channels 46 are disposed within a second surface 48 of the third plate in a substantially parallel relationship with one another and in a substantially vertical, parallel relationship with the second coolant channels having the second length 32b disposed within the second plate. A second return channel 50, having an elongated elliptical shape disposed within the third plate proximate a first end 52 of the third coolant channels in a substantially perpendicular relationship thereto extends from the first surface to the second surface of the third plate and is in substantial alignment with and in flow communication with the first return channel 34 disposed within the second plate. The second return channel has a length substantially equal to the length of the first return channel. Fourth-through holes 54 disposed within a second end of the third coolant channels remote from the second return channel are in alignment with and in flow communication with the second end of the second coolant channels having a second length 32b. Fifth-through holes 56 disposed within the third plate proximate the second end of the third coolant channels, are in alignment with the third-through holes 42 disposed within the second plate and in flow communication therewith for passing a coolant therethrough. Sixth-through holes 58 are disposed within the third plate intermediate the third coolant channels at the first end thereof proximate the second return channel in alignment with and in flow communication with the second coolant channels having a first length 32a within the second plate.

The substrate plate 18 has a first surface 60 with a coolant distribution channel 62 disposed therein in alignment with and in flow communication with the sixth-through holes 58 and the first end 52 of the third coolant channels 46 disposed within the third plate 16, said first surface 60 is adapted for communicating with the second surface 48 of the third plate to enclose the third coolant channels and the coolant distribution channel therebetween forming conduits adapted for passing coolant therein. A coolant entrance port 64 is connected to the coolant distribution channel through a side 65 of the substrate plate and is adapted for connection to a source of coolant (not shown). A third return channel 66 disposed within the substrate plate proximate the coolant distribution channel extends through the substrate plate from the first surface 60 to a second surface 68 and is in alignment with and in flow communication with the second return channel 50 disposed within the third plate 16. A coolant exit manifold 70, disposed in the substrate plate proximate a side of the substrate remote from the third return channel, extends through the substrate plate from the first surface to the second surface 60, 68 respectively and is in alignment with and in flow communication with the fifth-through holes 56 disposed within the third plate 16. A coolant exit port 72 passes from the coolant exit manifold through a side of the substrate plate and is adapted for passing a coolant from the mirror.

The back plate 20 has a first surface 74 with a plurality of heating channels 76 disposed therein. Said first surface 74 is adapted for cooperating with the second surface 68 of the substrate plate 18 to enclose the heating channels therebetween forming conduits for passing fluid therebetween in heat exchanger relationship thereto. A first end 78 of each of the heating channels are aligned with the third return channel 66 and in flow communication therewith. A second end 80 of the heating channels are aligned with and in flow communication with the coolant exit manifold 70. In the preferred embodiment the width of the heating channels 76 and the third coolant channels 46 are greater than the width of the first and second coolant channels. Additionally, the number of third coolant channels disposed within the third plate is approximately one-half the number of second and first coolant channels disposed within the second plate and the faceplate respectively.

Figure 2:
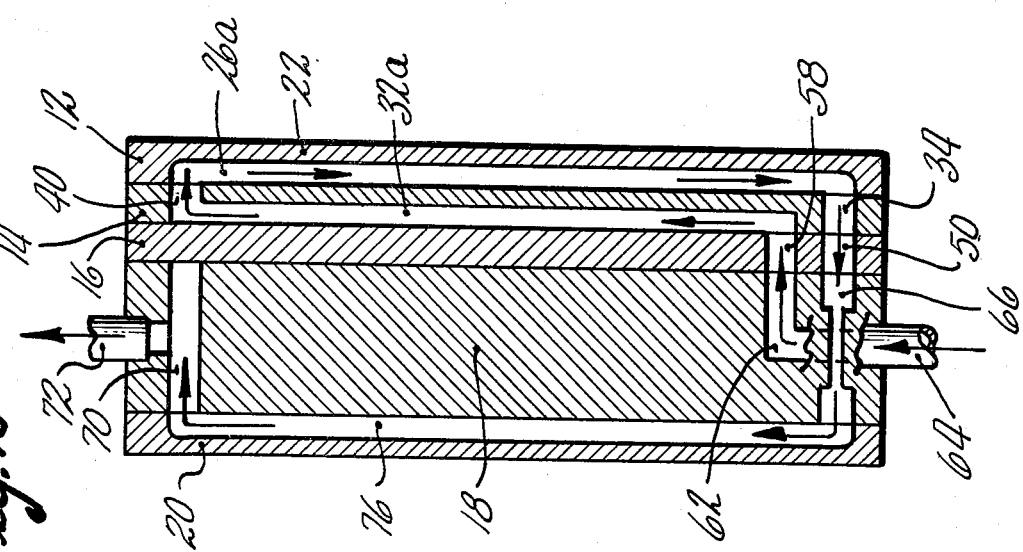
FIG. 2 is a view in the direction A—A of a first cross section of the laminated structure of FIG. 1 showing a first flow path.
Figure 3:
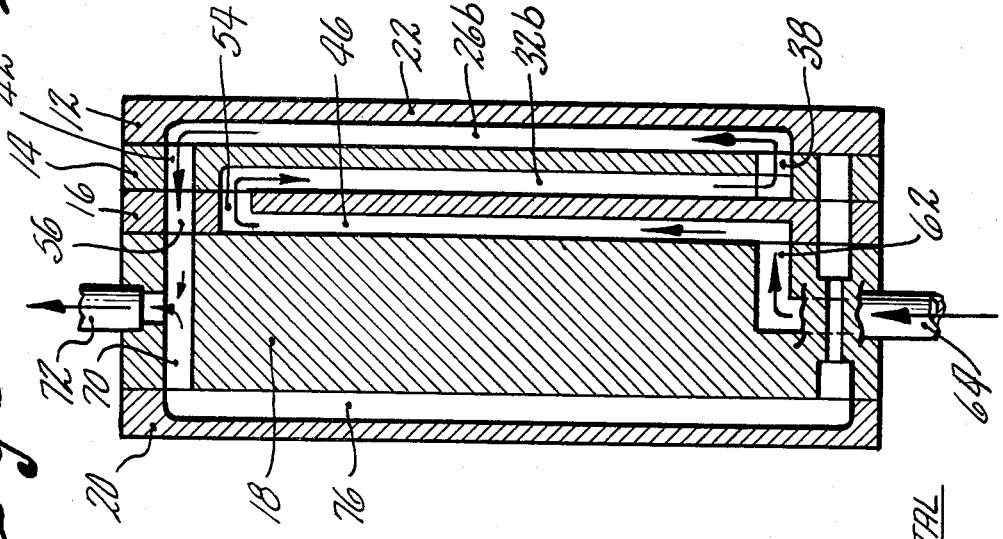
FIG. 3 is a view in the direction A—A of a second cross section of the laminated structure of FIG. 1 showing a second flow path.

Referring now to FIGS. 1, 2 and 3, in operation a coolant fluid from a source (not shown) is directed through the coolant entrance port 64 to the coolant distribution channel 62 which directs the fluid to the third plate 16 where a portion of the coolant fluid passes along a first flow path as shown more fully in FIG. 2 through the sixth-through holes 58 to the second coolant channels having first length 32a within the second plate 14. The coolant passes across a substantial portion of the width of the second plate 14 in heat exchanger relationship therewith to the second-through holes 40 which directs the coolant to the first coolant channels having the first length 26a within the faceplate 12 where the coolant flows across a substantial portion of the width of the faceplate in heat exchanger relationship therewith. The coolant then passes through the first, second and third return channels 34, 50, 66 respectively into the heating channels 76 within the back plate 20. The temperature of the coolant passing through the second plate and the faceplate is increased by the heat absorbed therein to provide a heating fluid. The heating fluid passes across the back plate through the heating channels 76 heating the back plate and substrate plate to provide a temperature balancing of the bending stress developed within the faceplate as disclosed in copending application Ser. No. 051,656 entitled, "Thermally Compensated Mirror," filed on June 25, 1979, incorporated herein by reference and held with the present application by a common assignee. The heated coolant fluid after passing through the heating channels 76 is directed to the coolant exit manifold 70 within the substrate plate 18 and passes out of the mirror structure through a coolant exit port 72.

The remaining portion of the coolant after passing through the coolant distribution channel 62 passes along a second flow path as shown in FIG. 3 through the third coolant channels 46 within the third plate 16 in heat exchanger relationship thereto and passes through the fourth-through holes 54 disposed within the ends of the third coolant channels into the second coolant channels having the second length 32b within the second plate 14. The coolant flows through said second coolant channels having second length 32b in a counterflow direction to the coolant flowing through the second coolant channels having a first length 32a as hereinbefore described. After passing through the second coolant channels having the second length 32b, the coolant passes through the first-through holes 38 disposed within the first end of the second coolant channels having a second length 32b and is directed into the first coolant channels having a second length 26b. The coolant flows through the channels having the second length 26b in heat exchanger relationship with the faceplate in a counterflow direction from the coolant flowing through the first coolant channels having a first length 26a. After passing through the coolant channels having the second length 26b, the coolant passes through the third-through hole and the fifth-through holes, 42, 56 respectively into the coolant exit manifold 70 and is passed out of the mirror structure through the coolant exit port 72.

Counterflowing the coolant fluid through alternate coolant channels within the faceplate and the second plate allows the temperature rise within the faceplate and the second plate to be much larger than previous designs since the thermal growth of the reflective surface of the faceplate is more uniform than prior art mirrors. The counterflow of coolant passing through alternate coolant channels within the faceplate minimizes temperature gradients across the surface of the faceplate. Similar counterflowing of coolant fluid between alternate second coolant channels within the second plate provides additional temperature stabilization of the faceplate. Counterflowing coolant between adjacent vertically aligned coolant channels with the faceplate and the second plate substantially eliminates thermal tilt of the reflective surface of the faceplate as more fully shown in FIG. 4.

Figure 4:
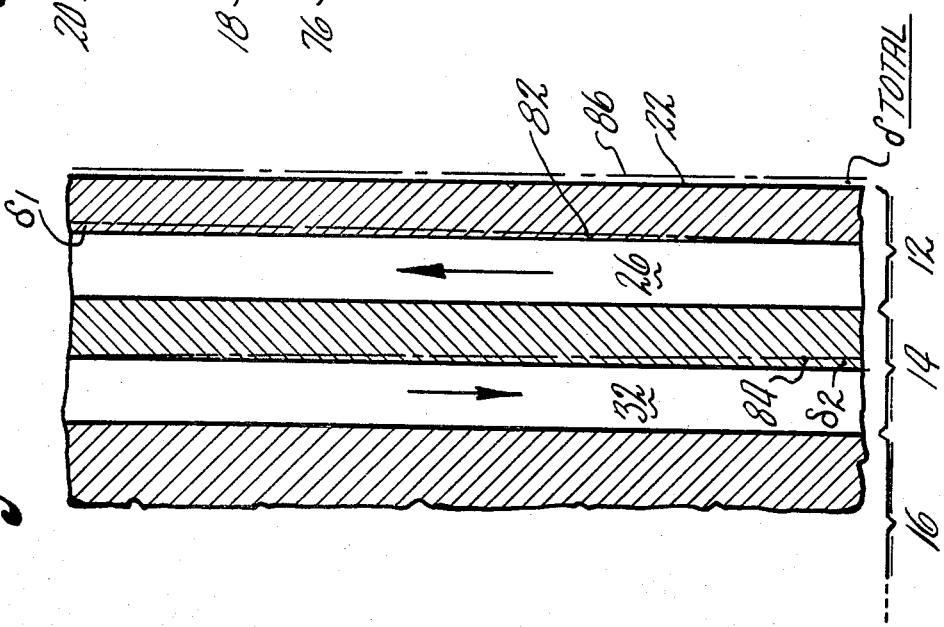
FIG. 4 is a simplified cross section view of the balancing of the thermal deformations produced by coolant flowing in the first and second flow paths through the faceplate and the second plate resulting in substantially no tilt of the reflective surface.

Referring now to FIG. 4 wherein a simplified schematic of the balancing of the deformations resulting from the temperature distribution of the coolant flowing through the faceplate and the second plate is shown which results in substantially no thermal tilt of the reflective surface. As shown, relatively cool coolant passes through the first coolant channels 26 from bottom to top. Since the coolant flows in heat exchanger relationship with the faceplate, the temperature of the coolant increases as the coolant flows therethrough resulting in a thermal deformation characteristic $\delta_1$ shown by the dotted line 82. Coolant flowing through the second coolant channels 32 in a counterflow direction to the flow of coolant within the first coolant channels 26 which are in vertical parallel alignment therewith, produces a thermal deformation $\delta_2$ as shown by the dotted line 84. The total deformation of $\delta_{total}$ of the reflective surface 22 of the mirror structure as shown by the dashed line 86 is the summation of $\delta_1 + \delta_2$ is a substantially uniform displacement along the width of the reflective surface. Thus the tilt resulting from $\delta_1$ is substantially counterbalanced by the tilt resulting from $\delta_2$ producing a substantially tilt-free reflective surface. This counterbalancing of the tilt deformation occurs across the entire surface of the mirror in heat exchanger relationship with the coolant channels.

It is to be recognized that the mirror of the present invention can be constructed with conventional mirror materials such as molybdenum and other materials well known in the art. The mirror may be fabricated of standard fabrication techniques utilizing faceplate, first and second plates and back plates having a thickness of approximately 0.1 cm. and a plate substrate having a thickness of approximately 2.5 cm. wherein the plates are secured together by means well known in the art to form a unitary laminated mirror structure. Additionally, the plates may have any cross-sectional configuration.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A thermally stabilized mirror having a laminated structure comprising:
   a faceplate having a first surface adapted for providing a reflective surface of the mirror and a second surface with a plurality of first coolant channels having a substantially parallel relationship with one another wherein alternate first coolant channels have a first and second length respectively;
   a second plate having a first surface disposed against the second surface of the faceplate and a second surface with a plurality of second coolant channels having a substantially parallel relationship with one another wherein alternate second coolant channels have a first and second length respectively, said second coolant channels having the first length being disposed in a substantially vertical parallel relationship with the first coolant channels having a first length and said second coolant channels having the second length being disposed in a substantially vertical parallel relationship with the first coolant channels having the second length;
   a third plate having a first surface disposed against the second surface of the second plate and a second surface having a plurality of third coolant channels having a substantially parallel relationship to one another and a substantially vertical parallel relationship with second coolant channels having the second length;
   means for passing coolant fluid through the third and second plate to provide a counterflow of coolant fluid in adjacent second coolant channels within the second plate, in adjacent first coolant channels within the first plate and in adjacent vertically aligned first and second coolant channels;
   a substrate plate having a first surface disposed against the second surface of the third plate and a second surface, a coolant distribution channel for providing coolant fluid to the means for passing coolant fluid through the third and second plate, means for passing coolant fluid into the mirror to the coolant distribution channel and means for passing coolant fluid out of the mirror;
   a back plate having a first surface disposed against the second surface of the substrate plate; and
   means for passing coolant fluid from the first coolant channels to the means for passing coolant fluid out of the mirror.

2. The invention in accordance with claim 1 wherein the means for passing coolant fluid through the second and third plates includes:
   a plurality of sixth-through holes disposed within the third plate wherein each of the plurality of sixth-through holes are positioned between adjacent third coolant channels in alignment with the coolant distribution channel and with a first end of the second coolant channel having a first length;
   a plurality of second-through holes disposed within a second end of each of the second coolant channels having first length and in alignment with a second end of the first coolant channels having the first length wherein the sixth and second-through holes are in flow communication to provide a first flow path through the second coolant channels having first length and the first coolant channels having first length;
   fourth-through holes disposed within a second end of the third coolant channels and in alignment with a second end of the second coolant channels having second length;
   first-through holes disposed within a first end of the second coolant channels having the second length and in alignment with the first end of the first coolant channels having second length wherein the fourth-through holes and the first-through holes are in flow alignment to provide a second flow path through the second coolant channels having second length and the first coolant channels having second length wherein the first flow path is in a counterflow direction to the second flow path within the faceplate and the second plate.

3. The invention in accordance with claim 2 wherein the means for passing coolant fluid from the first coolant channels to the means for passing coolant fluid out of the mirror includes:
   a first return channel disposed within the second plate proximate the first ends of the second coolant channels in flow alignment with the first ends of the first coolant channels having first length;
   a second return channel disposed within the third plate in flow alignment with the first return channel;
   a third return channel disposed within the substrate plate in flow alignment with the second return channel;
   a plurality of heating channels disposed within the first surface of the back plate having a first end in flow alignment with the third return channel and a second end in flow alignment with the means for passing coolant fluid out of the mirror wherein said first, second and third return channels and the heating channels complete the second flow path through the mirror;
   a plurality of third-through holes disposed within the second plate between adjacent second coolant channels having first length proximate the second end of the second coolant channels having first length in flow alignment with the second ends of the first coolant channels having second length; and
   a plurality of fifth-through holes disposed within the third plate remote from the second return channel in flow alignment with the third-through holes and the means for passing coolant fluid out of the mirror wherein the third-through holes and the fifth-through holes define flow passages to complete the first flow path within the mirror.

4. A method of minimizing thermal tilt in the reflective surface of a mirror comprising:

passing coolant in heat exchanger relationship with the reflective surface in a counterflow direction between adjacent coolant channels disposed within the mirror proximate the reflective surface; and providing a flow of coolant in a counterflow direction within adjacent second coolant channels positioned within the mirror in heat exchanger relationship to and remote from the reflective surface in a substantially vertical parallel relationship with the first coolant channels wherein the flow of coolant in a second coolant channel is in a counterflow direction from the flow of coolant in a vertically aligned first coolant channel whereby tilt deformation resulting from the temperature distribution of the coolant flowing through the first coolant channels is counterbalanced by the tilt deformation resulting from the temperature distribution of the coolant counterflowing through the second coolant channels to produce a substantially zero net tilt of the reflective surface.

5. The invention in accordance with claim 4 further including passing a portion of the coolant fluid through the heating channels within a back plate of the mirror after the coolant has passed in heat exchanger relationship with the reflective surface of the mirror to provide a flow of heating fluid in heat exchanger relationship with the back plate and a substrate plate of the mirror to induce thermal distortions therein for compensating bending distortions of the reflective surface resulting from heat generated therein by the absorption of radiation incident thereon.

* * * * *